United States Patent
Frey

(10) Patent No.: US 9,042,874 B2
(45) Date of Patent: *May 26, 2015

(54) SYSTEM AND/OR METHOD FOR USING MOBILE TELEPHONES AS EXTENSIONS

(75) Inventor: Alan E. Frey, Naperville, IL (US)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

This patent is subject to a terminal disclaimer.

(21) Appl. No.: 13/408,663

(22) Filed: Feb. 29, 2012

(65) Prior Publication Data

US 2013/0225141 A1 Aug. 29, 2013

(51) Int. Cl.
- *H04M 3/42* (2006.01)
- *H04W 4/16* (2009.01)
- *H04M 3/00* (2006.01)
- *H04W 4/02* (2009.01)

(52) U.S. Cl.
CPC .............. *H04W 4/16* (2013.01); *H04W 4/021* (2013.01); *H04M 3/00* (2013.01)

(58) Field of Classification Search
CPC .......... H04M 3/00; H04W 4/021; H04W 4/16
USPC .......... 455/417, 413, 445; 370/452, 483, 248, 370/470; 709/251, 223, 224
See application file for complete search history.

(56) References Cited

U.S. PATENT DOCUMENTS

| | | | | |
|---|---|---|---|---|
| 4,709,365 A | * | 11/1987 | Beale et al. | 714/4.1 |
| 5,627,842 A | * | 5/1997 | Brown et al. | 714/727 |
| 6,463,472 B1 | * | 10/2002 | Van Loo | 709/224 |
| 6,704,796 B1 | * | 3/2004 | Cosgriff et al. | 709/238 |
| 7,302,255 B1 | * | 11/2007 | Lundy et al. | 455/414.1 |
| 7,526,296 B1 | * | 4/2009 | Lundy et al. | 455/461 |
| 2003/0196076 A1 | * | 10/2003 | Zabarski et al. | 712/234 |
| 2003/0204636 A1 | * | 10/2003 | Greenblat et al. | 709/251 |
| 2003/0212830 A1 | * | 11/2003 | Greenblat et al. | 709/251 |
| 2005/0021713 A1 | * | 1/2005 | Dugan et al. | 709/223 |
| 2005/0117726 A1 | * | 6/2005 | DeMent et al. | 379/142.01 |
| 2007/0140150 A1 | * | 6/2007 | Beck et al. | 370/279 |
| 2007/0153999 A1 | * | 7/2007 | Daigle | 379/142.07 |
| 2007/0154004 A1 | * | 7/2007 | Daigle | 379/211.04 |
| 2007/0154005 A1 | * | 7/2007 | Daigle | 379/211.04 |
| 2007/0281703 A1 | * | 12/2007 | Shkedi | 455/445 |
| 2008/0096553 A1 | * | 4/2008 | Saksena et al. | 455/426.2 |
| 2010/0054441 A1 | * | 3/2010 | Daigle | 379/207.02 |
| 2011/0177797 A1 | * | 7/2011 | Vendrow et al. | 455/414.1 |
| 2011/0305238 A1 | * | 12/2011 | Ikuta et al. | 370/352 |

OTHER PUBLICATIONS

"SIP Message Flows", Alcatel-Lucent, Mar. 2010, 7 pp.

* cited by examiner

*Primary Examiner* — Joseph Arevalo
(74) *Attorney, Agent, or Firm* — Fay Sharpe LLP

(57) ABSTRACT

A method of dynamically invoking a simultaneous ring feature in a telecommunications network includes: identifying a call directed to an address of an end user device (30); notifying user equipment (20) other than the end user device (30) of the identified call; and, receiving an indication from the user equipment (20) whether or not the simultaneous ring feature should be invoked so as to establish a call leg to the user equipment (20).

15 Claims, 3 Drawing Sheets

SYSTEM AND/OR METHOD FOR USING MOBILE TELEPHONES AS EXTENSIONS

BACKGROUND

The present inventive subject matter relates generally to the art of telecommunications. Particular but not exclusive relevance is found in connection with mobile telephones, and accordingly the present specification makes specific reference thereto. It is to be appreciated however that aspects of the present inventive subject matter are also equally amenable to other like applications.

It is not uncommon for people to routinely carry two mobile telephones, as well as having a number of fixed lines telephone, e.g., such as a work phone and a home phone. A person who carries multiple mobile phones may have bought one of the phones himself, for personal use and that may be billed to his personal account, and had a second phone given to him by his employer, which he uses for business and that may be billed to his employer's account. In many cases, either one of the two mobile phones may be fully capable of handling all of the person's communication services, i.e. voice calls, video calls, text messaging, and web browsing, so having multiple phones is a nuisance rather than a convenience; what the person may really want is to be able to carry a single mobile phone that can be used for both personal use as well as business use, but still have personal calls billed to the person's personal account, and work-related calls billed to his employer's account.

While a single mobile phone may be convenient and/or desirable to use, there may still be any number of reasons why a person would also want to have and use other telephones and/or telecommunication devices, e.g. home phones, office desk phones and/or work telephone, and/or a tablet, laptop or other computer, e.g., running a Voice over Internet Protocol (VoIP) application. For example, while a tablet computer isn't as easy to carry around as a mobile phone, it has a much larger keyboard and video display than a mobile phone, and as a result, people may prefer to use a tablet rather than a mobile phone to watch videos or carry on a long text message exchange, assuming that the tablet is within easy reach. Fixed line work phones and home phones can only be used when the person is at that given location; however that could be a location where mobile phone service is not available. In addition, the person may prefer to use his home or work phone instead of his mobile phone because the sound quality of the fixed line phone may be noticeably better than his mobile phone. Accordingly, it may be desirable for a person to selectively use any of their phones for both personal and business use, and have the calls and other use billed to the proper account.

To solve the aforementioned problem, a conventional simultaneous ring service or feature may be used to ring a plurality telephones when a call is directed to the telephone subscribing to the service or feature. However, conventional simultaneous ring services may have certain limitations and/or drawbacks. For example, conventional simultaneous ring services are generally static, i.e., they do not response dynamically to individual calls. In this case, the designated telephones are generally rung each time a call is placed to the subscribing telephone regardless of any other criteria. This can be undesirable for any number of reasons. For example, ringing a particular telephone may not be desired at some times. Additionally, a user may have multiple telephones subscribing to a simultaneous ring feature, e.g., a work phone and a home phone. Presuming both simultaneous ring the user's mobile phone when either the work phone or the home phone is originally call, when a user answers a call on his mobile telephone, he may wish to know the number of the telephone that the call was originally placed to, e.g., his work phone number or his home phone number or his mobile phone number. A conventional simultaneous ring service may not provide this information. Additionally, if a mobile phone is one of the phones designated to be simultaneously rung but that mobile phone is not powered on at the time the user is called, the call leg to the mobile phone may be immediately forwarded to and automatically answered by the voicemail system set up for this mobile phone. Once the call leg to the mobile phone is answered, the call legs being simultaneously set up to the user's other phones are dropped. Since the call leg to the mobile phone is answered by the automated voice mail system so quickly, in most cases the user being called has no chance to answer the call on one of his fixed line phones, e.g. his work phone or his home phone, since the call legs to the fixed line phones are dropped.

Accordingly, a new and/or improved method, apparatus, mobile application and/or system is disclosed which addresses the above-referenced problem(s) and/or others.

SUMMARY

This summary is provided to introduce concepts related to the present inventive subject matter. The summary is not intended to identify essential features of the claimed subject matter nor is it intended for use in determining or limiting the scope of the claimed subject matter. The embodiments described below are not intended to be exhaustive or to limit the invention to the precise forms disclosed in the following detailed description. Rather, the embodiments are chosen and described so that others skilled in the art may appreciate and understand the principles and practices of the present inventive subject matter.

In accordance with one embodiment, a method is provided for dynamically invoking a simultaneous ring feature in a telecommunications network. The method includes: identifying a call directed to an address of an end user device; notifying user equipment other than the end user device of the identified call; and, receiving an indication from the user equipment whether or not the simultaneous ring feature should be invoked so as to establish a call leg to the user equipment.

In accordance with another embodiment, a method is provided for dynamically invoking a simultaneous ring feature in a telecommunications network. The method includes: sending a first request from a mobile telephone to a node of the telecommunications network, the first request requesting that the mobile telephone be notified if a call is directed to an designated address of an end user device; receiving at the mobile telephone a notification when a call is directed to the designated address; and, sending a second request from the mobile telephone in response to the received notification, the second request requesting that the simultaneous ring feature be invoked.

In accordance with yet another embodiment, a method is provided for dynamically invoking a call processing feature in a telecommunications network. The method includes: establishing a subscription to notify user equipment in response to a call condition; identifying the call condition; notifying the user equipment of the identified call condition; and, receiving an indication from the user equipment, in response to the notification, whether or not the feature should be invoked.

Numerous advantages and benefits of the inventive subject matter disclosed herein will become apparent to those of ordinary skill in the art upon reading and understanding the present specification. It is to be understood, however, that the detailed description of the various embodiments and specific examples, while indicating preferred and other embodiments, are given by way of illustration and not limitation. Many changes and modifications within the scope of the present invention may be made without departing from the spirit thereof, and the invention includes all such modifications.

BRIEF DESCRIPTION OF THE DRAWING(S)

The following detailed description makes reference to the figures in the accompanying drawings. However, the inventive subject matter disclosed herein may take form in various components and arrangements of components, and in various steps and arrangements of steps. The drawings are only for purposes of illustrating exemplary and/or preferred embodiments and are not to be construed as limiting. Further, it is to be appreciated that the drawings may not be to scale.

DETAILED DESCRIPTION OF THE EMBODIMENT(S)

For clarity and simplicity, the present specification shall refer to structural and/or functional elements, relevant standards and/or protocols, and other components that are commonly known in the art without further detailed explanation as to their configuration or operation except to the extent they have been modified or altered in accordance with and/or to accommodate the embodiment(s) presented herein. Moreover, the apparatuses and methods disclosed in the present specification are described in detail by way of examples and with reference to the figures. Unless otherwise specified, like numbers in the figures indicate references to the same, similar or corresponding elements throughout the figures. It will be appreciated that modifications to disclosed and described examples, arrangements, configurations, components, elements, apparatuses, methods, materials, etc. can be made and may be desired for a specific application. In this disclosure, any identification of specific materials, techniques, arrangements, etc. are either related to a specific example presented or are merely a general description of such a material, technique, arrangement, etc. Identifications of specific details or examples are not intended to be, and should not be, construed as mandatory or limiting unless specifically designated as such. Selected examples of apparatuses and methods are hereinafter disclosed and described in detail with reference made to the figures.

Figure 1:
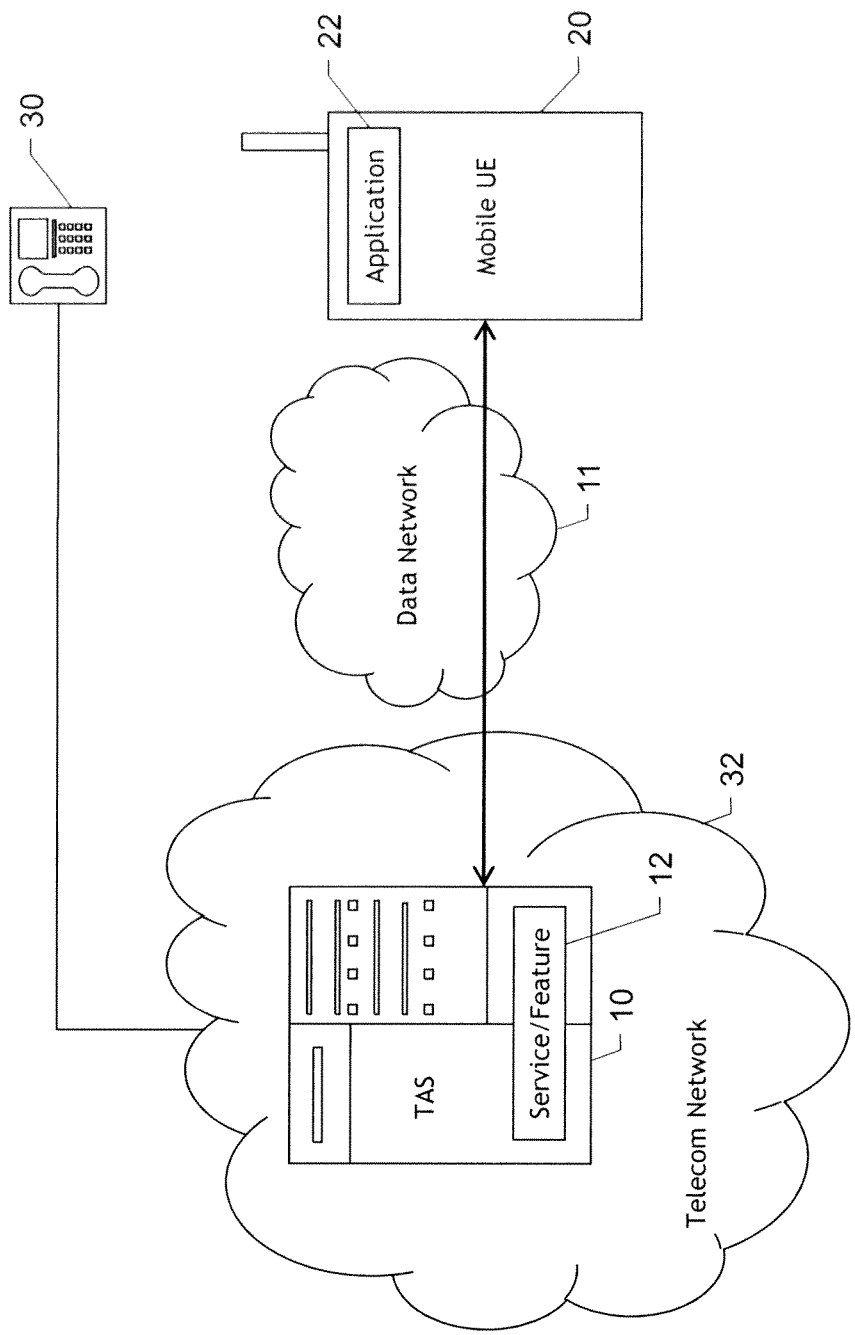
FIG. 1 is a diagrammatic illustration showing a telephony application server and mobile user equipment suitable for practicing aspect of the present inventive subject matter.

With reference now to FIG. 1, in general, the present specification relates in part to a telephony feature and/or service. As shown, the service or feature (indicated by reference numeral 12) is implemented via a server side application or process running on a telephony application server 10, which permits a user and/or subscriber to selectively employ their mobile smart telephone or other like user equipment (UE) 20 as an extension, e.g., of one or more fixed line or mobile telephones or other like end user devices capable of receiving telephone calls. In practice, another client side application (indicated by reference numeral 22) for utilizing and/or configuring the aforementioned feature or service 12 may be downloaded and/or otherwise installed on the user's mobile UE 20. As shown, the telephony application server (TAS) 10 and mobile UE 20 (and/or the service 12 and the application 22) may communicate via a suitable data network 11.

Suitably, the user may selectively configure the application 22 so that when a call is placed and/or directed to a designated address or telephone number or directory number (DN) of another fixed line or mobile telephone or other like end user device (EUD), the UE 20 may also be simultaneously called and/or rung depending upon one or more criteria. In practice, the application 22 may selectively post, send or otherwise provide a subscription or request to the TAS 10 administering and/or providing the service 12, to be notified thereby whenever the aforementioned designated address or telephone number or DN is called, any and/or all of which are referred to nominally herein as the primary DN for the sake of convenience. For example, as shown in FIG. 1, an EUD 30 may be provided or associated with the primary DN such that calls placed to the primary DN are normally directed and/or routed to the EUD 30 over a telecommunications network 32 serving the EUD 30. For example, the EUD 30 may be the user's work or business telephone, home telephone, a second mobile telephone, or other suitable fixed line or mobile device; and the network 32 may include a Public Switched Telephone Network (PSTN), a mobile network, a local access network, etc. and/or some combination thereof.

Accordingly, when a call is placed and/or directed to the primary DN, before the call is set up with or completed to the EUD 30 associated therewith, the TAS 10 in response to the subscription or request notifies the application 22 on the UE 20 of the impending call. Suitably, completion and/or setting up of the call with the EUD 30 is optionally suspended or delayed until the application 22 responds to the notification or until sufficient time for the application 22 to response has elapsed. Generally, in response to the notification, the application 22 determines whether or not UE 20 should be simultaneously called and/or rung based on one or more criteria, e.g., such as the time of day, the date, the day of the week or other temporal parameters, the location of the UE 20 (e.g., as determined by a GPS receiver or via other suitable location determining equipment and/or methods), the identity of the calling party, etc.

Optionally, the application 22 may be configured such that when the application 22 is launched or otherwise started to run on the UE 20, the application 22 posts or provides a subscription or otherwise sends a request to the TAS 10 to be notified thereby if and/or when a call is placed or directed to the primary DN. Accordingly, when such a call is identified, the TAS 10 in response to the subscription provides the requested notification to the application 22 on the UE 20. In this way, the UE 20 and/or application 22 is notified of calls placed or being directed to the EUD 30. Accordingly, in response to the notification, the application 22 may selectively instruct the TAS 10 (depending on certain criteria) of the desire to have implemented a simultaneously calling and/or ringing of UE 20. In this way, selective invocation of a simultaneous ring feature and/or other desired call handling instructions may be dynamically provided from the UE 20 to the TAS 10 at the time a called is detected or identified as being placed or directed to the primary DN, e.g., which is provided for and/or associated with the EUD 30.

Figure 2:
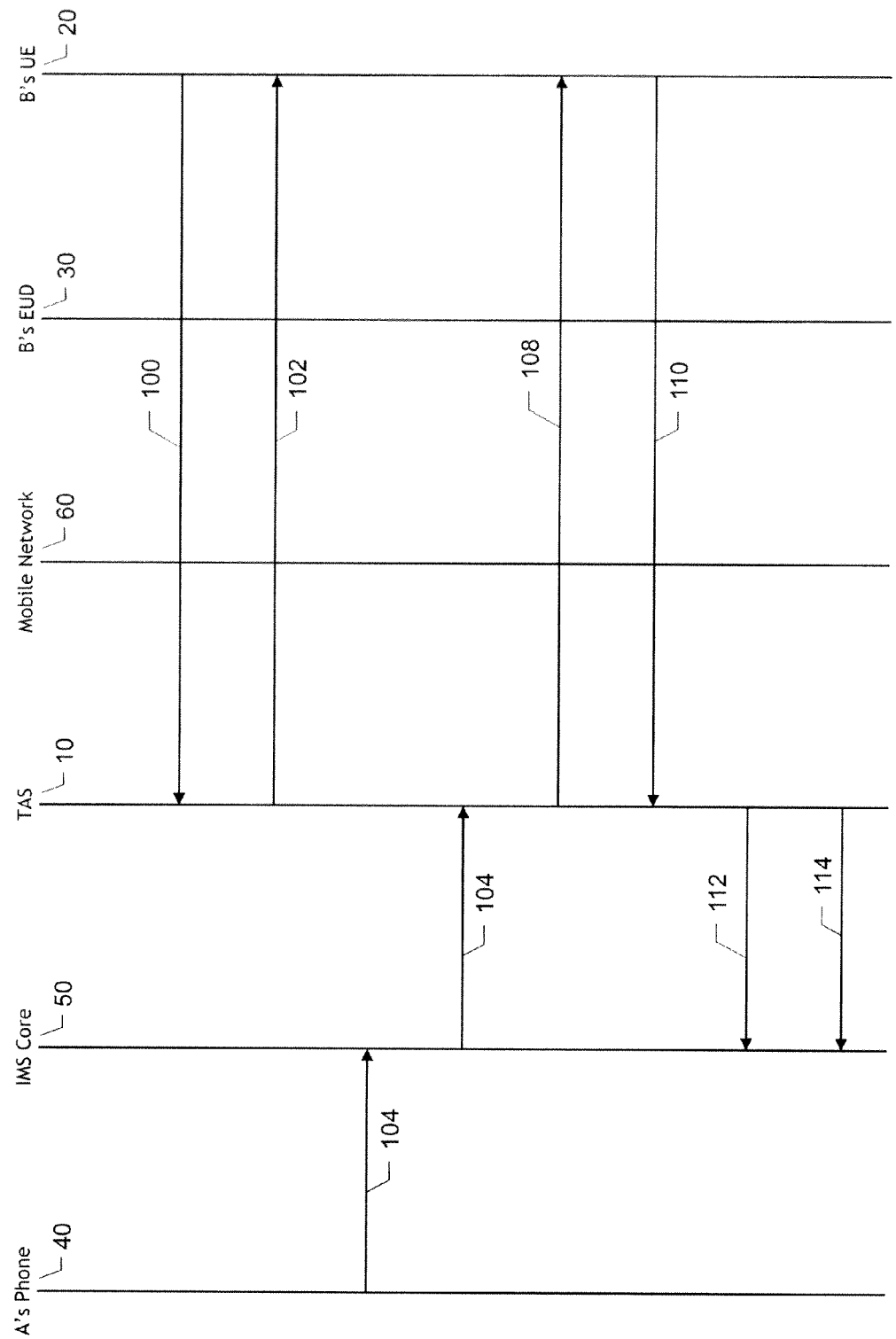
FIG. 2 is a post and rail diagram illustrating a partial call flow suitable for practicing aspects of the present inventive subject matter.
Figure 3:
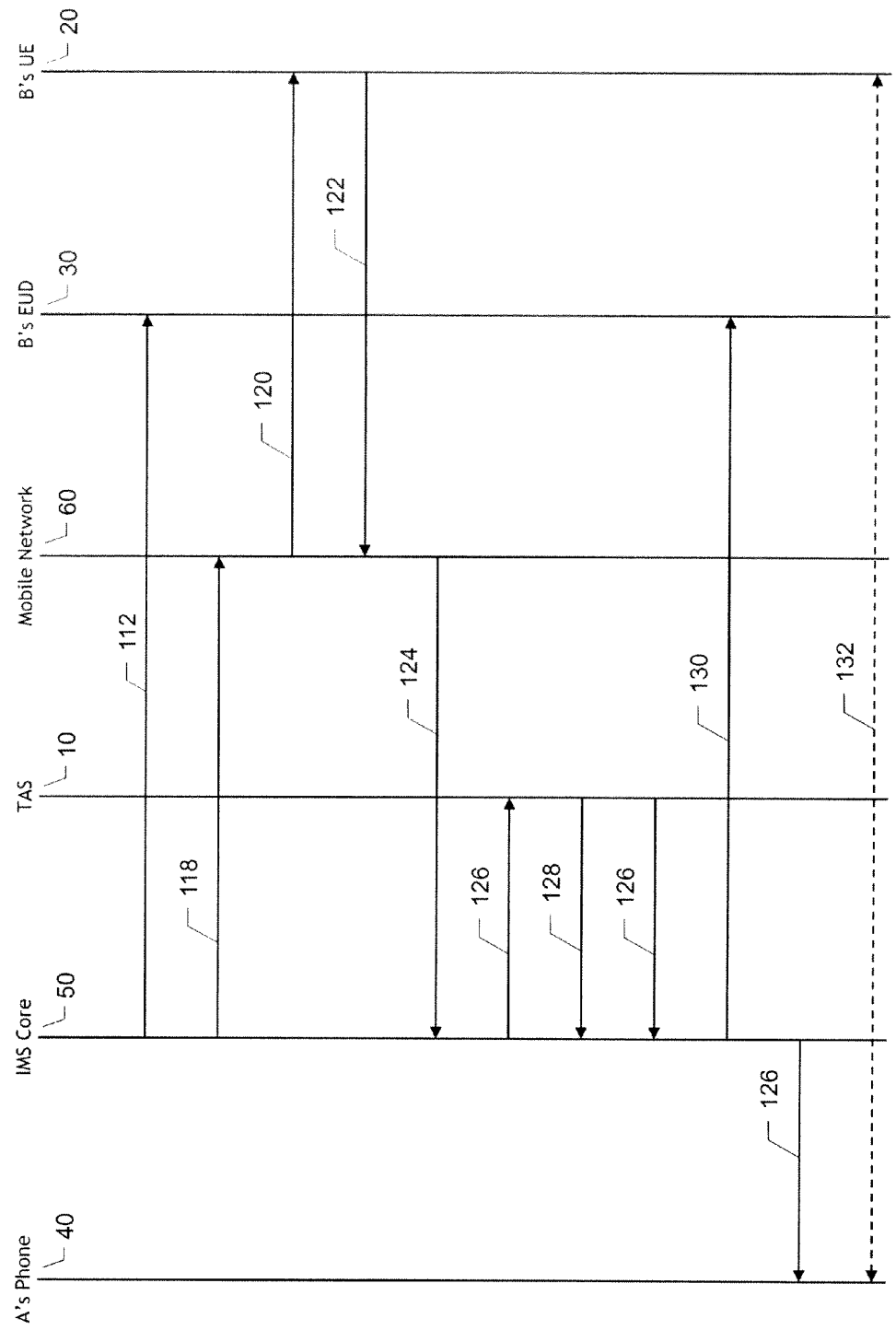
FIG. 3 is a post and rail diagram illustrating a continuation of the call flow from FIG. 2, where the top of FIG. 3 continues from the bottom of FIG. 2.

With reference to FIGS. 2 and 3, there is illustrated an exemplary call flow suitable for practicing aspects of the present inventive subject matter. As shown, a number of network entities and/or network nodes or components participate in the illustrated call flow, including: a calling party A that uses their telephone 40 or the like to place a call to the EUD 30 of a party B (i.e., the user and/or subscriber); an Internet Protocol (IP) Multimedia Subsystem (IMS) or IMS Core 50; the TAS 10; a mobile network 60; and party B's UE 20. In the illustrated call flow, various messages and/or signaling are exchanged between the aforementioned network entities, nodes, etc. Suitably, each network entity, node, etc. is therefore in the usual manner operatively connected to and/or otherwise in communication with the other network entities, nodes, etc. to which messages and/or signals are sent and/or from which messages and/or signals are received. While certain network entities, nodes, etc. are shown in the illustrated call flow, it is to be appreciated that as appropriate and/or in other various alternate embodiments, other intervening and/or otherwise arranged network entities, nodes, etc. (which are not shown) may be utilized in practice in the usual manner to route, forward, translate and/or otherwise facilitate the transmission of the various messages and/or signals.

For the purpose of this exemplary call flow, it is assumed that party B has signed up for, registered and/or otherwise has active for their mobile UE 20 the feature or service 12 administered by the TAS 10, and have downloaded or otherwise had installed the application 22 on their UE 20. Suitably, party B has also configured the application 22 so that calls to his EUD 30 will also selectively ring his UE 20 under certain conditions.

Suitably, the application 22 may consult or access a profile or table or database (DB) to determine which subscriptions to post and/or notification requests to send the TAS 10. Each profile may have one or more associated fields and the user (or party B in this example) may selectively enter values in each of the fields. For example, each profile may include a field for: the name associated with a given EUD (e.g., "work phone"); the primary DN for that EUD; and optionally any desired temporal or location restrictions and/or other criteria applicable for that EUD. In one suitable embodiment, a plurality of such profiles may be included in a table or DB or the like, with each profile corresponding to a different EUD. For example, one profile may be defined for a user's work telephone, another for a user's home telephone, another for a user's second mobile telephone, etc.

Accordingly, e.g., when the application 22 is launched and/or otherwise running on the UE 20, the application 22 accesses and/or consults the table or DB, and posts a subscription or sends a notification request for each profile to the TAS 10. Suitably, each subscription or request identifies the application 22 and/or UE 20 posting the subscription or making the request (e.g., with the address or telephone number or DN or other ID of the UE 20) and indicates the primary DN from the profile to which the subscription or request relates.

As shown in FIGS. 2 and 3, the application 22 running on the UE 20 posts a subscription or otherwise sends a notification request 100 to the TAS 10, requesting notification when the primary DN from one of the profiles is called, e.g., the primary DN for the EUD 30. Suitably, the subscription or notification request message 100 may take the form of a Hypertext Transfer Protocol (HTTP) POST that identifies the UE 20, e.g., via its address and/or DN, and requests notification when a call is directed to the primary DN of the EUD 30. In response, the TAS 10 optionally returns confirmation 102 of the subscription or request, e.g., via an HTTP 201 CREATED message or the like.

At some time later (but while the subscription or notification request is still in effect and/or active), party A calls party B's EUD 30, e.g., by dialing the same on party A's telephone 40. Accordingly, a suitable message or signal 104 is directed to the IMS Core 50. For example, the message or signal 104 may be a Session Initiation Protocol (SIP) INVITE message or the like which indicates the DN or address being called, i.e., the primary DN of the EUD 30 in this case. In turn, the message or signal 104 is forwarded to the TAS 10.

Upon receiving the forwarded massage or signal 104, the TAS 10 notes the address or DN being called, and since the application 22 running on the UE 20 has subscribed and/or requested to be notified about calls to the EUD 30 (or more specifically to the primary DN associated therewith), instead of immediately setting up the call to the EUD 30, the TAS 10 first sends a notification 108 to the UE 20 and waits for a response therefrom indicating how the call should be handled. For example, the notification 108 may take the form of an HTTP POST that indicates a call is being directed to the address or DN of the EUD 30, and it may also indicate the identity (i.e., address and/or DN) of the calling party, in this case party A. Optionally, the application 22 may translate the indicated address or DN being called from the notification 108 (i.e., the primary DN in this case) into the name of the called device or location, e.g., by looking-up a matching primary DN in the DB or table of profiles and selecting the value in the associated name field. Suitably, the application 22 may provide or display or otherwise output the selected name from the associated field of the profile having the matching primary DN and/or the address or DN being called as indicated in the notification 108. For example, the aforementioned data or information may be output on a display of the UE 20. Optionally, the identity of the calling party as indicated in the notification 108 may also be so output.

In response to receiving the notification 108, the application 22 running on the UE 20 now determines if a simultaneous ring is to be performed, optionally, based on one or more criteria. Optionally, since the subscription was still active, it may be assumed that a simultaneous ring to the UE 20 is still desired. That is to say, optionally, upon closing or stopping the application 22 and/or powering down or shutting off of the UE 20, the UE 20 and/or the application 22 thereon may cancel the previously posted subscription or notification request with the TAS 10. Accordingly, in that case, the TAS 10 upon receiving the forwarded call set up request or message 104 would not suspend otherwise normal call processing and would not send the notification 108 to the UE 20 (since no active or current subscription or notification request would be registered with the TAS 10), but would instead allow the call to be set up normally and/or otherwise process the call in the usual manner. Optionally, in response to the notification 108, the application 22 may confirm or again determine whether or not to invoke the simultaneous ring feature, e.g., by accessing the aforementioned profiles as previously described.

Suitably, the application 22 may also consider other criteria (e.g., defined in one or more of the profiles) to determine whether or not to request performing a simultaneous ring. For example, depending on the calling party identified in the notification 108 and/or temporal or location restrictions (e.g., defined in the current profile), the application 22 may choose whether or not to request performance of a simultaneous ring. Optionally, the application 22 may again access and/or consult the active or current profile (i.e., the profile have the primary DN which matches the called address or DN in the current notification 108) to obtain any criteria or temporal or location restriction which may apply to determine whether or not to request performance of a simultaneous ring.

Suitably, if the application 22 determines that simultaneous ring is not to be performed, then an appropriate response to the notification 108 may simply be returned to the TAS 10 and in turn the TAS 10 would allow the call to be set up normally and/or otherwise process the call in the usual manner.

However, as shown in FIGS. 2 and 3, it is assumed that the application 22 has determined that simultaneous ring should be requested. Accordingly, in response to the notification 108, a signal or message 110 requesting the same is returned to the TAS 10. For example, the signal or message 110 may take the form of an HTTP 200 OK message including and/or accompanied by a request to perform or invoke simultaneous ringing. Suitably, the message or signal 110 also identifies the address or DN or telephone number of the UE which is to be simultaneously called or rung (in this case party B's mobile UE 20).

Accordingly, since the application 22 has requested and/or invoked simultaneous ringing via the message or signal 110, the TAS 10 will in response set up or initiate set up of a call leg directed to the EUD 30 (e.g., which is the otherwise normal operation for the call) and also simultaneously (or substantially simultaneously) set up or initiate set up of a call leg or fork directed to the address or DN identified in the signal or message 110, i.e., party B's UE 20 in this case. More specifically, as shown in FIGS. 2 and 3, corresponding call set up requests or messages 112 and 114 are directed to the IMS Corce 50. For example, call set up or request messages may be SIP INVITEs indicating the respective addresses and/or DNs to which the calls or call legs are being directed.

Consequently, the IMS Core 50 routes the call set up or request message 112 to the EUD 30. In this manner, the EUD 30 is rung or otherwise alerted by the incoming call in the usual manner. For the other call leg or fork (i.e., to mobile UE 20), the IMS Core 50 sends a message 118 and/or otherwise signals the mobile network 60 (in response to the call set up request message 114 for the mobile UE 20). The mobile network 60 in turn engages in a call set up exchange 120 with the UE 20 such that the UE 20 is rung or otherwise alerted accordingly. Suitably, the message 118 may take the form of an Integrated Services Digital Network (ISDN) User Part (ISUP) Initial Address Message (IAM), e.g., which includes the address and/or DN to which the call or call leg is being directed, in this case the address or DN of the UE 20. Accordingly, both the UE 20 and EUD 30 are made to ring or otherwise alert.

For the purpose of this example, the call flow follows the case where the UE 20 is answered first. However, it is to be appreciated that in practice the EUD 30 may be answered first. In that case, a similar call flow may result, however, the call leg and/or call set up to the EUD 30 would be completed, while the call leg or fork to the UE 20 would be released or dropped or otherwise cancelled.

As shown, when the UE 20 is answered, an answer message or other like signal 122 is returned to the mobile network 60, which in turn sends a message 124 or otherwise signals the IMS Core 50 that the call has been answered. In response, the IMS Core 50 sends a message 126 to or otherwise signals the TAS 10, indicating that the call has been answered. For example, the message 126 may take the form of an HTTP 200 OK message responsive to the call set up or request message 114. Once the TAS 10 is informed that one of the call legs set up for the call has been answered (in this case the call leg set up to the UE 20), it drops the other call leg set up for the call (in this case the call leg to the EUD 30). It also sends back the appropriate signaling and/or message(s) to the calling party to set up the connection, in this case between party A's telephone 40 and party B's mobile UE 20.

More specifically, as shown in the illustrated call flow, the message 126 may simply be forwarded and/or otherwise routed back from the TAS 10 through the IMS Core 50 to party A's telephone 40. In this way, the connection 132 is established and/or otherwise completed between the telephone 40 and the UE 20. Moreover, as shown in the illustrated call flow, to cancel the call leg to the EUD 30, the TAS 10 may send a cancel message 128 or other like message or signal to the IMS Core 50, which would in turn send or forward or otherwise route a release or cancel message 130 or other like message or signal to the EUD 30. Accordingly, the EUD 30 would cease ringing and/or otherwise alerting.

As the example call flow demonstrates, a simultaneous ring feature is selectively invoked dynamically at the time of a particular call to a user's EUD, optionally in response to various criteria. In practice, the call set up and/or completion to the EUD may be temporarily suspended or delayed, while it is determined whether or not the simultaneous ring feature should be invoked.

Optionally, in addition to dynamically invoking a simultaneous ring function, the service or feature 12 and application 22 may also provide other functionality. In one example, the application 22 may be utilized to place calls from the UE 20 which appear to originate from the primary DN of another EUD.

For example, assuming the TAS 10 had a subscription or notification request lodged therewith by the UE 20 to notify the UE 20 (or more particularly the application 22) of calls for and/or directed to the primary DN of the EUD 30. Then, the user employs the UE 20 to call the EUD 30. The TAS 10 would recognize the call and notify the application 22 on the UE 20 (in accordance with the subscription) that the UE 20 was placing a call to the EUD 30. The application 22 would then recognize that the UE 20 on which it was running was in fact placing the call; therefore, it would treat the call accordingly. That is to say, the application 22 would recognize this condition as the user's desire to place a call appearing to come from the EUD 30. Suitably, the application 22 could request input of the actual DN or address one desired to call. This would then be communicated to the TAS 10, which would set up a call leg to the entered DN or address using the primary DN of the EUD 30 as the calling party identifier, and bridge the original call thereto. Of course, optionally, a DN or address which the user ultimately desires to call could be input initially into and/or using the application 22, which then initiates the foregoing process. That is to say, inputting or using the application 22 to enter a DN or address the user wishes to call, would not in fact cause the UE 20 to place a call to that DN or address. Rather, the application 22 would response by prompting the UE 20 to place a call to the primary DN of the EUD 30, and the process would continue as described above.

As still another option, the application 22 may be provisioned to allow a user to readily transfer calls between their UE 20 and other EUDs, e.g., such as the EUD 30. Again, for example, assuming the TAS 10 had a subscription or notification request lodged therewith by the UE 20 to notify the UE 20 (or more particularly the application 22) of calls for and/or directed to the primary DN of the EUD 30. Then, the user employs and/or the application 22 instructs the UE 20 to call the EUD 30. The TAS 10 would recognize the call and notify the application 22 on the UE 20 (in accordance with the subscription) that the UE 20 was placing a call to the EUD 30. The application 22 would then recognize that the UE 20 on which it was running was in fact placing the call; therefore, it would treat the call accordingly. In this case, the application 22 could provide transfer and/or bridging instructions to the TAS 10 based on recent activity by and/or with the application 22.

As still another option, the application 22 may be provisioned to allow a user to use his UE 20 to pick up a call to another EUD, e.g. EUD 30, which is waiting to be answered. Again, for example, assuming the TAS 10 had a subscription or notification request lodged therewith by the UE 20 to notify the UE 20 (or more particularly the application 22) of calls for and/or directed to the primary DN of the EUD 30. Then, when party A calls party B's EUD 30, the TAS 10 would recognize the call and notify the application 22 on the UE 20 (in accordance with the subscription) that the party A was placing a call to the EUD 30. The application 22 would then send a response to the TAS 10 to allow the call to be set up normally (rather than send a response to simultaneously ring UE 20). Application 22 on UE 20 would alert the user about the call to EUD 30 from party A. The user could use the application 22 on UE 20 to pick up the call to EUD 30 that is waiting to be answered, at which point the application 22 instructs the UE 20 to call the EUD 30. The TAS 10 would recognize the call and notify the application 22 on the UE 20 (in accordance with the subscription) that the UE 20 was placing a call to the EUD 30. The application 22 would then recognize that the UE 20 on which it was running was in fact placing the call; therefore, it would treat the call accordingly. In this case, the application 22 could provide call pick up instructions to the TAS 10, based on recent activity by and/or with the application 22, and TAS 10 would connect party A to the UE 20.

Indeed, the service 12 and application 22 may cooperate to dynamically provide any number of call handling and/or processing functions based on various subscriptions and/or notification requests lodged with the TAS 10 by the application 22. In practice, otherwise normal call handling or processing is at least temporarily interrupted and/or suspended, while the TAS 10 provides any triggered notifications to the UE 20 and/or the application 22 running thereon and potentially receives alternate handling and/or processing instructions therefrom, e.g., optionally depending on criteria evaluated by the application 22 or otherwise. In this way, different services and/or features may be dynamically invoked.

The above methods, apparatus and/or systems have been described with respect to particular embodiments. It is to be appreciated, however, that certain modifications and/or alteration are also contemplated.

It is to be appreciated that in connection with the particular exemplary embodiment(s) presented herein certain structural and/or function features are described as being incorporated in defined elements and/or components. However, it is contemplated that these features may, to the same or similar benefit, also likewise be incorporated in other elements and/or components where appropriate. It is also to be appreciated that different aspects of the exemplary embodiments may be selectively employed as appropriate to achieve other alternate embodiments suited for desired applications, the other alternate embodiments thereby realizing the respective advantages of the aspects incorporated therein.

It is also to be appreciated that any one or more of the particular tasks, steps, processes, methods, functions, elements and/or components described herein may suitably be implemented via hardware, software, firmware or a combination thereof. In particular, the TAS 10 and/or mobile UE 20 may include a processor, e.g., embodied by a computer or other electronic data processing device, that is configured and/or otherwise provisioned to perform one or more of the tasks, steps, processes, methods and/or functions described herein. For example, a computer or other electronic data processing device employed in the TAS 10 and/or the mobile UE 20 may be provided, supplied and/or programmed with a suitable listing of code (e.g., such as source code, interpretive code, object code, directly executable code, and so forth) or other like instructions or software or firmware (e.g., such as the application 22 or an application to administer the service or feature 12), such that when run and/or executed by the computer or other electronic data processing device one or more of the tasks, steps, processes, methods and/or functions described herein are completed or otherwise performed. Suitably, the listing of code or other like instructions or software or firmware is implemented as and/or recorded, stored, contained or included in and/or on a non-transitory computer and/or machine readable storage medium or media so as to be providable to and/or executable by the computer or other electronic data processing device. For example, suitable storage mediums and/or media can include but are not limited to: floppy disks, flexible disks, hard disks, magnetic tape, or any other magnetic storage medium or media, CD-ROM, DVD, optical disks, or any other optical medium or media, a RAM, a ROM, a PROM, an EPROM, a FLASH-EPROM, or other memory or chip or cartridge, or any other tangible medium or media from which a computer or machine or electronic data processing device can read and use. In essence, as used herein, non-transitory computer-readable and/or machine-readable mediums and/or media comprise all computer-readable and/or machine-readable mediums and/or media except for a transitory, propagating signal.

Optionally, any one or more of the particular tasks, steps, processes, methods, functions, elements and/or components described herein may be implemented on and/or embodiment in one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the respective tasks, steps, processes, methods and/or functions described herein can be used.

Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

In short, the present specification has been set forth with reference to preferred and/or other embodiments. Obviously, modifications and alterations will occur to others upon reading and understanding the present specification. It is intended that the invention be construed as including all such modifications and alterations insofar as they come within the scope of the appended claims or the equivalents thereof.

What is claimed is:

1. A method of dynamically invoking a simultaneous ring feature in a telecommunications network, said method comprising:
   identifying a call directed to an address of an end user device associated with a subscriber to a simultaneous ring feature, the address having been previously designated by the subscriber as a primary number in conjunction with the simultaneous ring feature;

notifying a subscriber device of the identified call, at least one of the subscriber and subscriber device having previously arranged to have notifications sent to the subscriber device after calls directed to the address of the end user device are identified in conjunction with the simultaneous ring feature;

setting up a call leg to a user equipment associated with the subscriber if an indication is received from the subscriber device in response to the notification of the identified call and the received indication invokes the simultaneous ring feature, the user equipment having been designated by the subscriber or subscriber device to receive the identified call along with the end user device in conjunction with invoking the simultaneous ring feature; and at least temporarily suspending setting up the call to the end user device to provide time for notifying the subscriber device of the identified call and receiving the indication from the subscriber device;

setting up a first call leg to the end user device; and if the simultaneous ring feature is invoked, setting up a second call leg to the user equipment.

2. The method of claim 1, said method further comprising:
obtaining a request from at least one of the subscriber and the subscriber device requesting notifications be sent to the subscriber device after a call directed to the address of the end user device is identified.

3. The method of claim 2, wherein the request is obtained after an application associated with the simultaneous ring feature installed on the subscriber device is launched.

4. The method of claim 1, wherein the second call leg is not set up if the received indication from the subscriber device is does not invoke the simultaneous ring feature.

5. The method of claim 1, wherein the end user device is a telephone.

6. The method of claim 1, wherein the user equipment is a mobile telephone.

7. A telephony application server provisioned to execute the method of claim 1.

8. A method of dynamically invoking a simultaneous ring feature in a telecommunications network, said method comprising:

sending a request from a mobile telephone to a network node of a telecommunications network requesting that the mobile telephone be notified if a call directed to a designated address of an end user device is identified by the network node, wherein the mobile telephone is associated with a subscriber to a simultaneous ring feature, wherein the request is associated with the simultaneous ring feature, wherein the designated address is a primary number in conjunction with the simultaneous ring feature;

receiving a notification at the mobile telephone via the telecommunications network that a call directed to the designated address was identified;

sending an indication from the mobile telephone to the network node in response to the received notification selectively invoking the simultaneous ring feature in conjunction with processing the call; and at the mobile telephone, determining whether or not the simultaneous ring feature is to be to invoked based at least in part on at least one of a temporal restriction, a determined location of the mobile telephone, and an identity of a calling party;

wherein the indication sent to the network node reflects the determination and the corresponding selective invoking of simultaneous ring feature;

wherein, in response to receiving the indication from the mobile telephone, the network node sets up a first call leg to the end user device and, in response to the received indication invoking the simultaneous ring feature, the network node sets up a second call leg to a user equipment associated with the subscriber.

9. The method of claim 8, wherein the network node is a telephony application server.

10. The method of claim 8, wherein the user equipment was designated by the subscriber or mobile telephone to receive the call along with the end user device in conjunction with invoking the simultaneous ring feature.

11. The method of claim 10, wherein the mobile telephone and the user equipment are the same telecommunication device.

12. The method of claim 10, wherein the request or the indication includes an identifying address of the user equipment.

13. The method of claim 8, wherein the request includes the designated address of the end user device.

14. A method of dynamically invoking a call processing feature in a telecommunications network, said method comprising:

establishing a subscription to notify a user equipment associated with a subscriber to a call processing feature in response to identification of a call condition associated with a subsequent user equipment option to selectively invoke the call processing feature;

identifying the call condition in conjunction with a call during call processing;

notifying the user equipment of the identified call condition; and, continuing processing of the call if an indication is received from the user equipment in response to the notification of the identified call condition and the received indication selectively invokes the call processing feature;

wherein, if the call processing feature is invoked, processing of the call continues in a first manner after the call processing feature is invoked and, if the call processing feature is not invoked, processing of the call continues in a second manner, wherein the first manner is different from the second manner;

wherein, in response to receiving the indication from the user equipment, a first call leg is set up to an end user device to which the call was originally directed and, in response to the received indication invoking the call processing feature, a second call leg is set up to the user equipment.

15. The method of claim 1, wherein the subscriber device and the user equipment are the same telecommunication device.

* * * * *